(No Model.)

T. C. CADWGAN.
FEED MILL.

No. 267,999. Patented Nov. 28, 1882.

Witnesses:
Alfred O. Ebner
J. A. Cady

Inventor:
Thomas C. Cadwgan
by Jeptha Garnard
his atty (No Model.)  2 Sheets—Sheet 2.

T. C. CADWGAN.
FEED MILL.

No. 267,999. Patented Nov. 28, 1882.

Witnesses:
J. H. Cady
Alfred O. Eckner

Inventor:
Thomas C. Cadwgan
By Jeptha Garrard
his atty

UNITED STATES PATENT OFFICE.

THOMAS C. CADWGAN, OF SPRINGFIELD, OHIO.

FEED-MILL.

SPECIFICATION forming part of Letters Patent No. 267,999, dated November 28, 1882.

Application filed July 5, 1882. (No model.)

*To all whom it may concern:*

Be it known that I, THOMAS C. CADWGAN, of Springfield, Clarke county, and State of Ohio, have invented certain new and useful Improvements in Feed-Mills; and I do declare the following to be a full, clear, and exact description of the same, reference being had to the accompanying drawings, forming part of this specification, in which—

Figure 1:
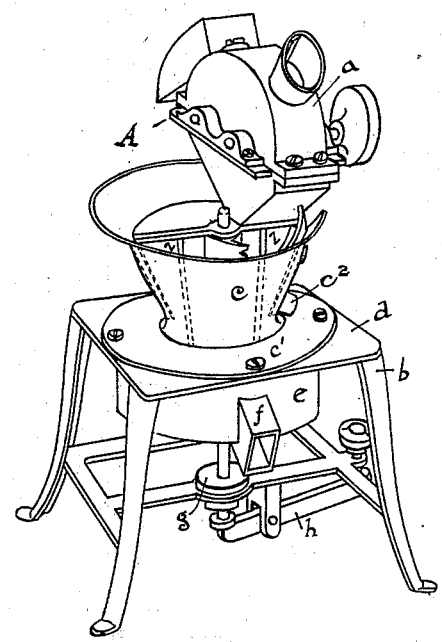
Figure 2:
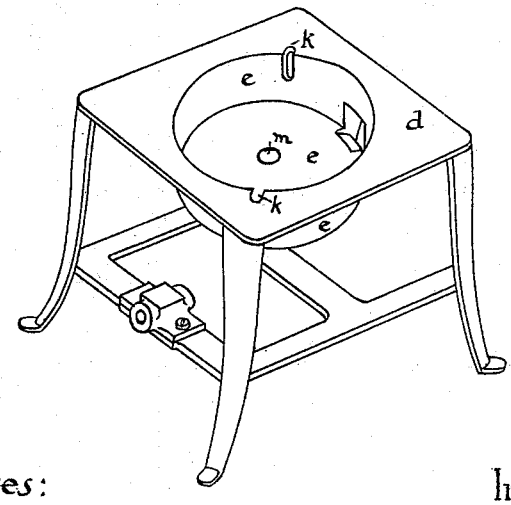
Figure 3:
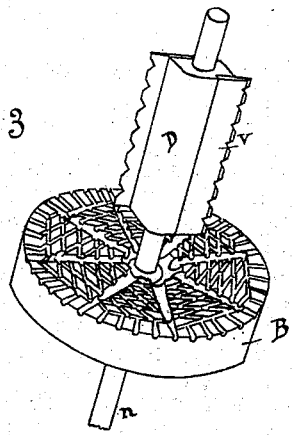
Figure 4:
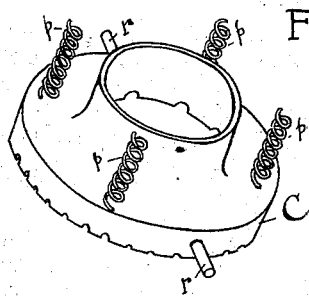
Figure 5:
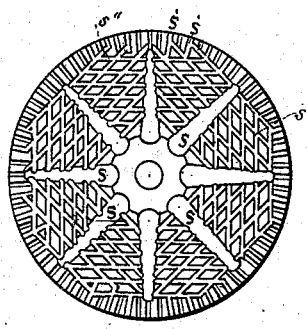
Figure 6:
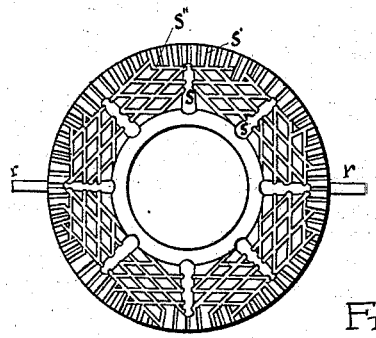
Figure 7:
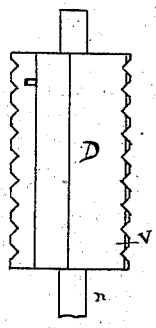
Figures 8, 9:
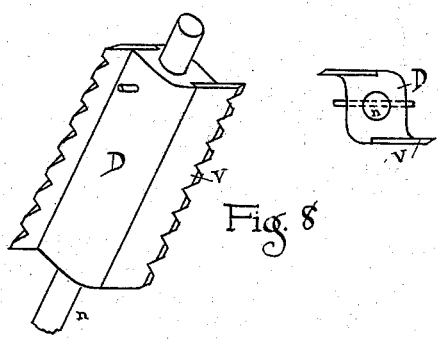

Figure 1 is a perspective view of the mill and corn-sheller. Fig. 2 is a perspective view of the frame of the mill and burr-chamber. Fig. 3 is a perspective view of crusher and lower millstone attached to same shaft. Fig. 4 is a perspective view of upper millstone, with its springs and supporting-pins. Fig. 5 is a plan of grinding-face of lower millstone. Fig. 6 is a plan of grinding-face of upper millstone. Fig. 7 is an elevation; Fig. 8, a perspective view, and Fig. 9 a plan view of the crusher.

The parts as indicated by letters are as follows: A, mill and corn-sheller; $a$, corn-sheller; $b$, mill; $c$, hopper; $c'$, hopper-flange; $c^2$, a spout; $d$, frame of mill; $e$, burr-chamber; $f$, flour or meal delivery; $g$, driving mechanism; $h$, adjustable step for burr-shaft; $k\,k$, slots inside of burr-chamber to receive pins of upper burr or millstone; $m$, burr-shaft hole in bottom of burr-chamber; B, revolving burr or millstone; $n$, burr-shaft; C, non-revolving burr or millstone; $p\,p$, springs on upper surface of millstone; $r\,r$, supporting-pins on opposite sides of upper millstone; D, cutting-edge crusher with serrated knife-blades $v$; $s$, radial cuts in surface of grinding-stones; $s'\,s'$, smaller radial cuts, and $s''\,s''$ diagonal cuts; $z$, ribs or projecting resisting flanges on inside of hopper.

The burrs are so arranged that the upper one shall be devoid of horizontal motion except to a slight degree and the lower one can be revolved horizontally, and also have a vertical movement when desired. This is effected by placing the revolving burr B, attached to its shaft $n$, in the bottom of a burr-chamber, $e$, in the ordinary way, and cutting slots $k\,k$ down the interior sides of this chamber of any required depth.

The upper or non-revolving burr, C, has two support-pins opposite to each other, inserted in its outside edge or side. This burr is let into the burr-chamber by placing these support-pins into the slots in the edge of said chamber. The bottoms of the slots limit the distance to which the upper burr can drop. The ends of these support-pins do not touch the metal or material of the burr-chamber, so that there is a slight lateral movement in the direction of the pins allowed to the burr, as it is of less diameter than the burr-chamber. In making these slots the metal may be entirely cut away, leaving only narrow holes in the side of burr-chamber. It will be seen that this burr may have a vertical motion, but cannot revolve. I control and modify this vertical motion by placing springs $p\,p$ on the upper surface of this burr near the outside edge. These springs are compressed and held down by the hopper-rim $c'$ when the hopper $c$ is placed in position. These support pins and springs constitute the means for holding the burr in place, and as the springs may yield singly as well as collectively to any obstacle to even running—as, for instance, a large or hard particle between the grinding-surfaces—the burr will in practice have a tilting motion.

The grinding-surface is formed of grooves $s$, cut in radial lines from the eye to a point near the circumference, wide and deep at the inner ends and becoming gradually shallower and narrower toward their outer ends. Around the skirt are short radial grooves or file-cuts $s'\,s'$, of a length equal to about one-third that of grooves $s$. Between the latter are diagonal grooves $s''\,s''$, which intersect each other and terminate in grooves $s$ and $s'\,s'$.

In hopper $c$ is a spout, $c^2$, which is closed when the mill is working and opened when it is decided to crush the corn and not grind it. The hopper also serves as a receptacle for the corn when it is desired to shell the corn and not crush it, and the product will then pass out of the hopper through spout $c^2$.

My mill is run in the usual way by connecting the burr-shaft with the power by belting or gearing. The cutting-edges of the serrated knife-blade are each about five-sixteenths of an inch long, so that the cobs are cut into pieces about the size of the kernels of corn, and are forced between the grinding-surfaces and ground as readily as the grain itself.

I am aware that the dress of millstones has been made by forming radial furrows extending from the skirt to the eye, and diagonal grooves intersecting each other and communicating with the radial grooves, but am not aware that minor radial grooves extending from the skirt inwardly and connecting with the diagonal grooves have ever been used.

I am also aware that it is old to have one non-revolving grinding-surface provided with means for holding it in such a manner that it will have a vertical tilting or yielding motion whenever meal or hard particles accumulate at any point between the burrs.

I am also aware that it is old to step the lower burr upon a lever provided with means for adjusting the burr.

The corn sheller, hopper, and crusher and means for supporting and revolving the spindle of the lower burr do not form any part of my invention, and to them I lay no claim; but,

Having thus described my invention, what I claim as new, and desire to secure by Letters Patent, is as follows:

1. The burrs of a feed-mill, provided with grinding-surfaces consisting of radial tapering grooves extending and gradually increasing in depth from the eye to a point near the skirt, diagonal grooves between the radial grooves, and short grooves extending from the skirt to the diagonal grooves, for the purpose set forth.

2. In a feed-mill, the combination, with a burr-chamber having slots in its wall, of burrs within the burr-chamber, the upper one being provided with pins which fit within the slots in the burr-chamber, and springs upon its upper surface, and a plate which supports the hopper, compresses the springs, and covers the slots in the burr-chamber, for the purpose set forth.

The foregoing specification of my invention signed by me this 28th day of June, A. D. 1882.

THOMAS C. CADWGAN.

Witnesses:
A. P. LINN COCHRAN,
L. M. POTTER.